United States Patent [19]

François

[11] 4,377,427

[45] Mar. 22, 1983

[54] PROCESS FOR THE MANUFACTURE OF LOCKS OF HAIR FROM SYNTHETIC FIBERS, DEVICE FOR PUTTING THIS PROCESS INTO OPERATION AND LOCKS OF HAIR THUS OBTAINED

[75] Inventor: Alain François, Meudon, France

[73] Assignee: R. George S.A., Paris, France

[21] Appl. No.: 202,229

[22] Filed: Oct. 30, 1980

[30] Foreign Application Priority Data

Nov. 20, 1979 [FR] France ................................ 79 28572

[51] Int. Cl.³ ...................... B29C 27/08; B30B 15/06; B32B 31/18
[52] U.S. Cl. .................................. 156/73.2; 156/73.3; 156/180; 156/251; 156/296; 156/433; 156/515; 156/580.2
[58] Field of Search ..................... 156/73.1, 73.2, 73.3, 156/580.1, 580.2, 515, 180, 181, 251, 296, 433

[56] References Cited

U.S. PATENT DOCUMENTS

| | | | |
|---|---|---|---|
| 3,184,354 | 5/1965 | Strother | 156/73.2 |
| 3,681,176 | 8/1972 | Reifenhauser et al. | 156/73.3 |
| 3,727,619 | 4/1973 | Kuris | 156/73.1 |
| 3,821,048 | 6/1974 | Acker et al. | 156/580.1 |
| 4,075,046 | 2/1978 | MacDonald | 156/73.1 |

Primary Examiner—Michael G. Wityshyn
Attorney, Agent, or Firm—Pollock, Vande Sande & Priddy

[57] ABSTRACT

Locks of hair from synthetic fibers grouped into a bundle are welded and then cut by ultrasonic waves in a two step process. The fiber bundle is placed on a platform having a pointed ridge, and a component comprising the emitter and an ultrasonic tool is moved downwardly in two stages. The emitter is deactivated during the return to its upper position.

2 Claims, 7 Drawing Figures

PROCESS FOR THE MANUFACTURE OF LOCKS OF HAIR FROM SYNTHETIC FIBERS, DEVICE FOR PUTTING THIS PROCESS INTO OPERATION AND LOCKS OF HAIR THUS OBTAINED

BACKGROUND OF THE INVENTION

The invention relates to the manufacture of locks of hair from synthetic fibers.

In certain trades such as the manufacture of wigs, dolls or hair dyes, there is often a need for locks of hair. In the case of dyes, for example, locks of hair are used to demonstrate to the clientele in hairdressing salons the different colors or shades which are available to them. Usually, these locks of hair are placed on a display card such as the one shown in FIG. 1. The display card 1 is a board, preferably made of cardboard, perforated with small holes 2 through which are threaded locks of hair 3 mostly made of synthetic fibers (polyamide or nylon, for example), owing to the high cost of real hair.

Since the display cards are designed to be handled frequently, it is necessary for the fibers which make up each lock of hair to be fixed together firmly at either end of the lock of hair.

Some manufacturers use staples, as shown in FIG. 2. However this type of fastening is not very firm and the staples 4 are liable to damage the display card at the place where the holes 2 are made, thus making it impossible to re-use the presentation card for other locks of hair of different shades.

A gas-heated blade has also been used for the manufacture of locks of hair. In this case, the cutting of the long bundles of fibers is carried out at the same time as the welding of these fibers at the cut ends. This technique has the following advantages: (a) two operations i.e., the cutting and the joining together of the fibers at the ends of the locks of hair, are carried out simultaneously; and (b) the join of the fibers, obtained by welding, is a very strong one.

Nevertheless, this technique has major disadvantages: at the time of welding, the material of which the fibers are composed is brought to a high temperature for a time sufficiently long to allow this material to flow. The welding is not perfect: it is not homogenous, extends over a relatively long length at each end of the lock of hair, and contains burrs which are liable to spoil the presentation card when the locks of hair are fitted. Moreover, this process is not very economical and the formation of smoke cannot be avoided.

SUMMARY OF THE INVENTION

The present invention aims to solve these disadvantages: it enables locks of hair with homogenous ends, flat and free of burrs, to be manufactured rapidly and economically.

The object of the invention is a process for the manufacture of locks of hair from synthetic fibers grouped into a bundle. According to the invention a point for welding the fibers
  a cutting of the welded fibers, at the centre of the weld is made successively in the bundle at regular intervals, the weld and the cut being effected ultrasonically.

According to a preferred method of the invention, the energy emitted by the ultrasonic waves is directed toward the precise spot which is to be welded, and the ultrasonic emitter is moved down towards this spot in two successive phases, the first corresponding to the welding and the second to the cutting, and it is then moved back up again. The ultrasonic waves are emitted only during the descent phases.

The invention also relates to a device for carrying out this process. Arranged one above the other, with a space in between for dividing the bundle of fibers; this device comprises:

a platform having a ridge with a pointed surface directed towards the source of energy
  a vertically moveable component comprising an ultrasonic emitter and an ultrasonic tool, with means for displacing the moveable component and programming of (a) the displacement of the moveable component, consisting of a descent in two stages and a continuous ascent, and (b) the activation of the ultrasonic emitter during the descent, and then its arrest during the ascent.

The invention also relates to locks of hair made of synthetic fibers obtained by means of the process according to the invention.

BRIEF DESCRIPTION OF THE DRAWINGS

The invention will now be described in greater detail with reference, by way of example, to a method of execution represented by FIGS. 3 and 4 attached.

Corresponding components have the same symbols in all the figures.

DESCRIPTION OF AN EMBODIMENT

Figure 1:
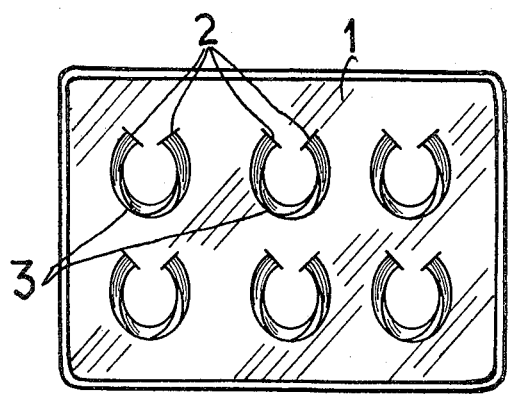
FIG. 1 shows a display card with sample locks of hair.
Figure 2:
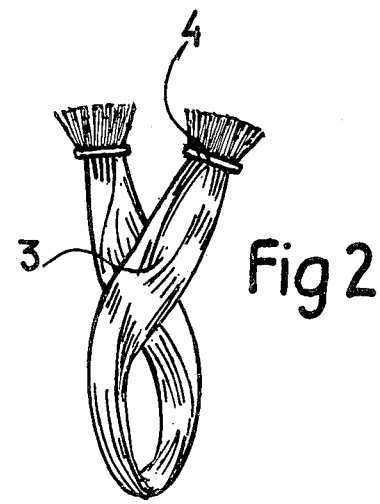
FIG. 2 shows a lock of hair made according to the prior art.
Figure 3:
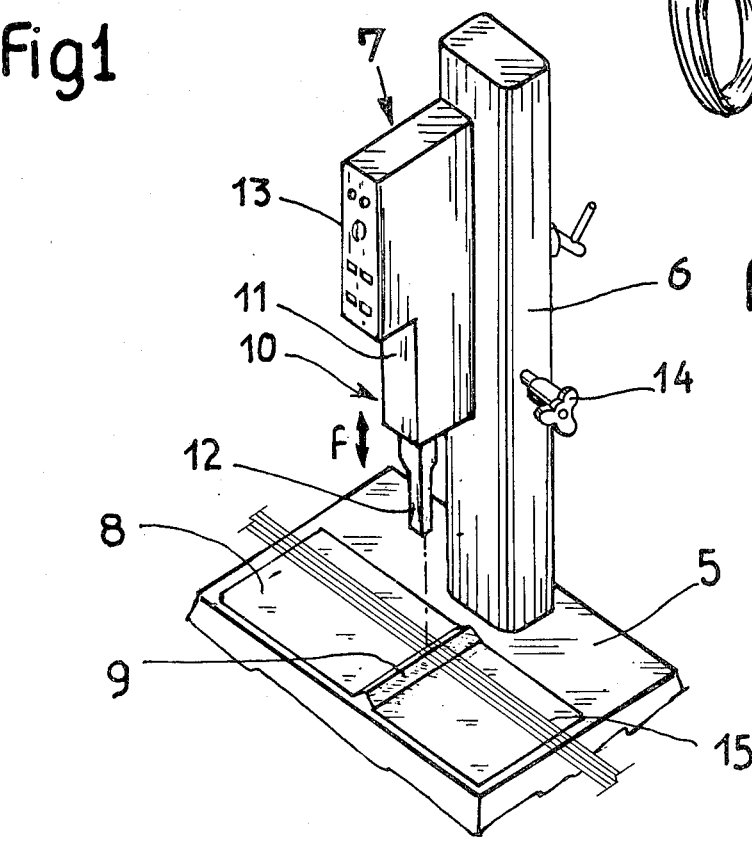
FIG. 3 shows a perspective view of an embodiment of the device according to the invention.

FIG. 3 shows a welding set comprising a base 5, a rigid column 6 and a housing 7.

On the base 5, there is a platform 8 having a ridge 9 pointing toward the source of energy.

The housing contains a component 10 moveable vertically in the direction of the arrow f and comprises an ultrasonic emitter 11 and an ultrasonic tool or sonotrode 12. Processes for producing ultrasonics will not be described because such processes are known and do not form the object of the invention).

The housing 7 also comprises a programmer 13 which controls both the displacement of the mobile component 10 (the means of displacement may consist of a jack, not shown) and (b) the activation of the ultrasonic emitter 11.

Figure 4A:
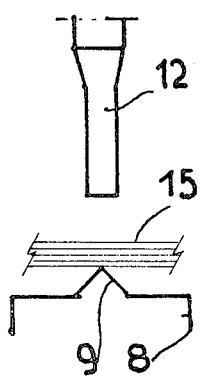
FIGS. 4a to 4d illustrate the process carried out by means of the device shown in FIG. 3.

The operation of the device is as follows:

(1) The welding set is positioned so that the sonotrode 12 is well situated above the pointed surface of the platform 8. The height of the housing 7 is adjusted by means of the adjusting screw 14. The bundle of fibers 15 is positioned between the sonotrode 12 and the point 9 of the platform, well below the sonotrode 12. Means not shown allow the bundle 15 to be held taut. A rest position is thus obtained (FIG. 4a).

Figure 4B:
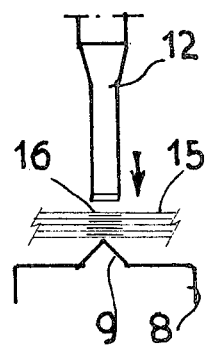

(2) Next comes the operational position. The programmer 13 controls the first phase of the descent of the sonotrode 12 towards the platform 8 as well as the activation of the ultrasonic emitter 11. During this first descent phase, the ultrasonic waves emitted by the sonotrode 12 carry out the welding of the synthetic fibers on a portion 16 of the bundle 15 positioned immediately below the sonotrode 12 (FIG. 4b).

Figure 4C:
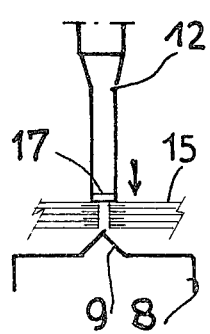

(3) During the second descent phase, also controlled by the programmer 13, the ultrasonic waves emitted by the sonotrode 12 carry out the cutting of the fibers at the centre 17 of the welded spot 16. This cut is facilitated by the pointed shape of the ridge which directs energy emitted by the ultrasonic waves to a point rather than dispersing it over a more extensive (FIG. 4c).

Figure 4D:
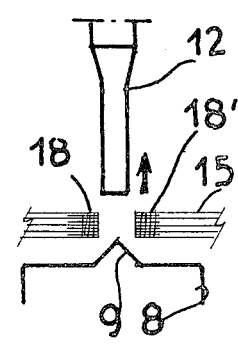

(4) The last phase is the re-ascent phase of the sonotrode 12. The re-ascent is controlled by the programmer 13 which also controls the arrest of the emission of ultrasonic waves. This emission is in fact no longer necessary and a considerable saving is made by making it function intermittently. The fiber ends 18 and 18' which are thus obtained are very flat, homogenous, free of burrs, and they have consumed only a small portion 16 of the material of which the fibers are composed (FIG. 4d).

The process described allows the fibers of each lock to be held together firmly by high quality smooth welds without burrs, and to be obtained very rapidly, in a single operation.

Moreover, the process is clean and smokeless. It consumes little energy, all the more so because this energy is consumed intermittently.

It will be understood that the invention is not strictly limited to the single method of execution which has been described by way of example, but also covers other methods which differ only in details.

Thus, the shape of the platform may be designed differently. If, for example, the latter were flat and did not have a ridge, the fibers would be welded but not cut; a string of fibers welded at regular intervals would thus be obtained.

The sonotrode may also take different forms, thereby affecting various parameters, in particular the amplitude of the ultrasonic waves.

Of course, the invention is not limited to the manufacture of locks of hair designed for the hairdressing trade, but may also be applied to the manufacture of sections of bundles of fibers provided that the material of which these fibers is composed permits welding by ultrasonics.

I claim:

1. Process for manufacturing locks of hair from synthetic fibers grouped in a bundle, comprising successively effecting on the bundle, by ultrasonic means, soldering of the fibers to one another at spaced locations, and cutting of the welded fibers at said locations, the energy emitted by said ultrasonic means being directed toward the precise location to be welded, said ultrasonic means being moved downwardly toward said location in two successive steps, the first step corresponding to the welding and the second step corresponding to the cutting, said ultrasonic means subsequently being raised again, ultrasonic waves being emitted only during said steps of said downward movement.

2. Apparatus for manufacturing locks of hair from synthetic fibers grouped in a bundle, comprising
(a) a platform (8) having a ridge with a pointed surface (9) directed towards a source of energy;
(b) a vertically moveable element (10) positioned above said platform (8) and separated therefrom by a space for separating said bundle of fibers, said element comprising an ultrasonic emitter (11) and an ultrasonic tool (12); and
(c) means for displacing said element and for programming
 (i) said displacement for two-stage descent and continuous ascent; and
 (ii) activation of said ultrasonic emitter during said descent and deactivation during said ascent.

* * * * *